June 14, 1927.
J. W. GOODROE
1,632,372
MACHINE FOR OPENING AND PREPARING COTTON
Filed July 29, 1926     2 Sheets-Sheet 2
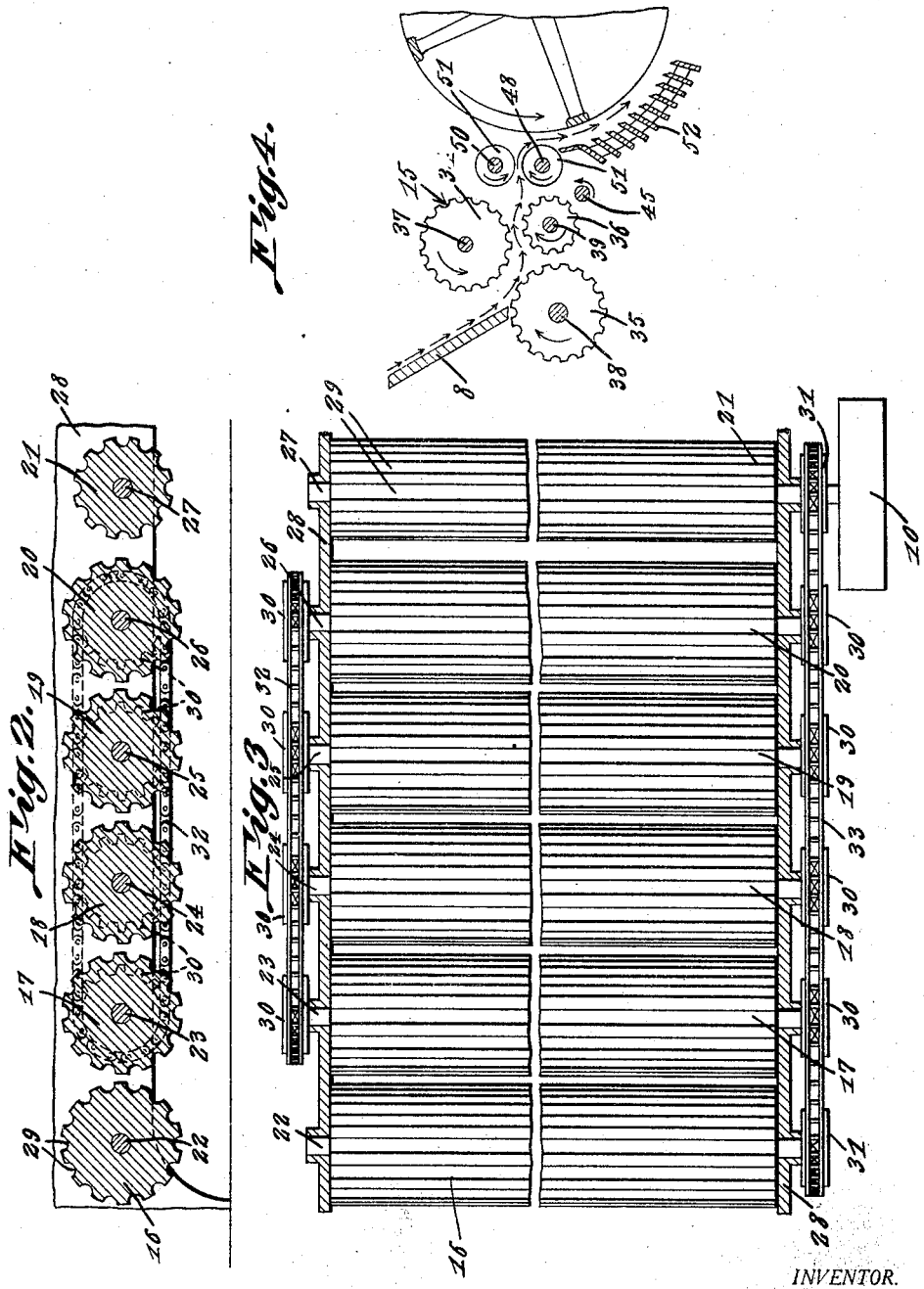
INVENTOR.
J. W. Goodroe,
BY
Geo. F. Kimmel   ATTORNEY.

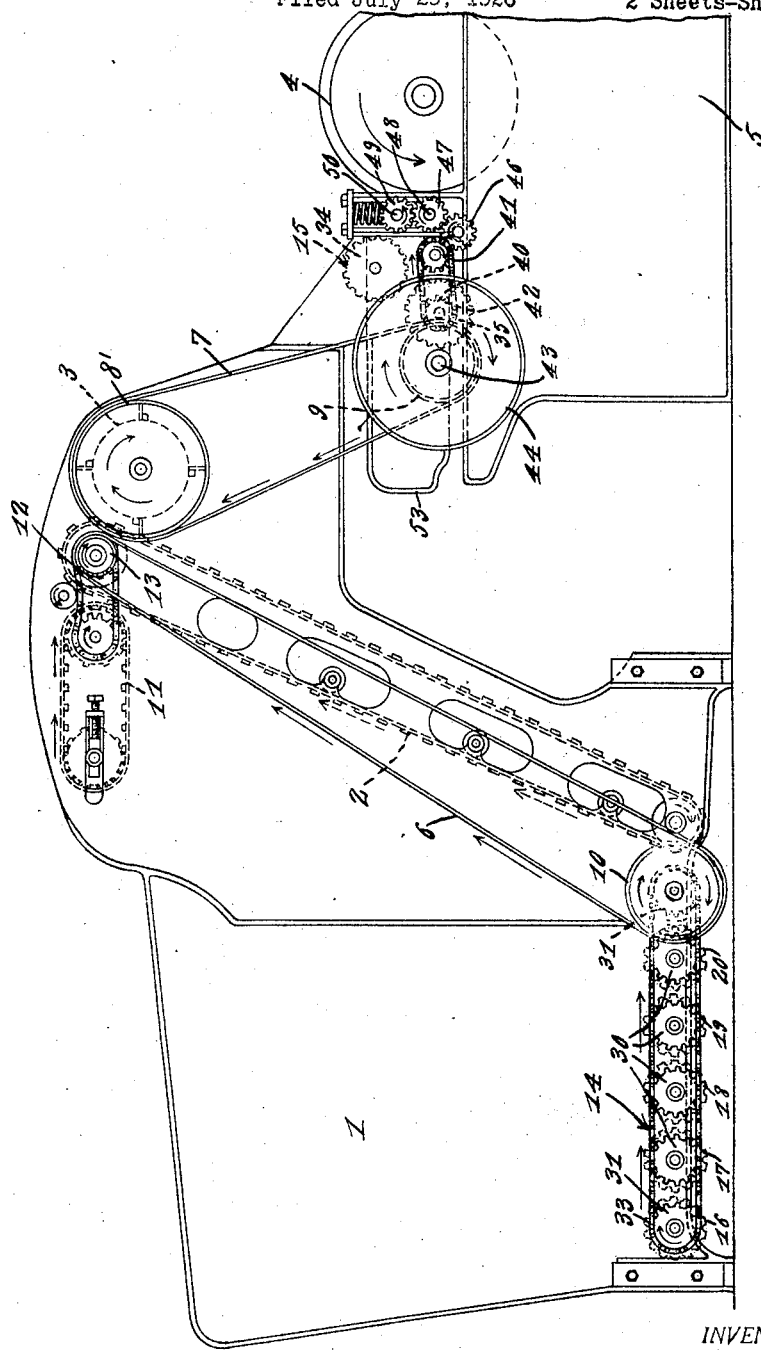

Patented June 14, 1927.

1,632,372

UNITED STATES PATENT OFFICE.

JAMES W. GOODROE, OF EXPERIMENT, GEORGIA.

MACHINE FOR OPENING AND PREPARING COTTON.

Application filed July 29, 1926. Serial No. 125,720.

This invention relates to machines for opening and preparing cotton for cotton breaker devices, more particularly to means to effect the forward movement of the cotton, and has for its object to provide in a manner as hereinafter set forth, a machine of the class referred to for effecting the forward movement of the cotton to the elevator apron or to the beater drums by fluted or corrugated conveying rolls, instead of by a conveyor apron, thus providing for an improved and more efficient conveying action over the means now employed, as the rolls provide for a more simple arrangement than that of the apron type, possess a longer life or wearing characteristic, and eliminate the expense of maintenance, replacement, and loss of operating time due to the delay in time required for repairing the conveyor apron or replacing the same.

With the foregoing and other objects in view the invention consists of the novel construction, combination and arrangement of parts as hereinafter more specifically described, and illustrated in the drawings wherein is shown an embodiment of the invention but it is to be understood that changes, variations and modifications can be resorted to which fall within the scope of the claims hereunto appended.

In the drawings wherein like reference characters denote corresponding parts throughout the several views:

Figure 1 is a side elevation of a machine for opening and preparing cotton provided with conveying elements in accordance with this invention.

Figure 2 is a longitudinal sectional view and

Figure 3 a sectional plan of the arrangement of conveying elements in accordance with this invention to provide for the forward movement of the cotton to the elevator apron of the machine.

Figure 4 is a fragmentary view in section, looking towards the end of the conveyor elements, in accordance with this invention, arranged in position for conveying the cotton to the beater or knocker drum.

Referring to the drawings in detail the hopper indicated at 1, elevating apron 2, Dauber drum 3, beater drum 4, collector 5, transmission belts 6, 7, conductor 8, driving elements 8', 9, 10, 11, 12 and 13 are of known construction and arranged in a known manner and are illustrated by way of example to show the adaptation therewith of conveyor elements, in accordance with this invention, with respect to the elevating apron and conveying elements in accordance with this invention, with respect to the beater drum. It is thought unnecessary to specifically describe the foregoing designated elements as they form no part of the constructive features of this invention.

This invention includes what may be termed a feeder mechanism, referred to generally by the reference character 14 for the elevating apron 2, and a feeder mechanism, referred to generally by the reference character 15, for the beater drum 4. The feeder mechanism 14 is positioned at the bottom of the hopper 1 and extends towards the lower end of the elevating apron 2. The feeder mechanism 15 is arranged at the lower end of the conductor 8 and extends towards the beater drum 4.

The feeder mechanism 14, consists of a set of parallel, spaced, closely arranged, lengthwise fluted or corrugated, forwardly revolving, synchronously operating, conveying rolls. The set of rolls comprises a forward end roll 21, a rearward end roll 16 and a plurality of intermediate rolls 17, 18, 19 and 20. As illustrated the set is shown as consisting of six rolls, but this number can be increased or diminished if desired. The forward end roll 21 is spaced a greater distance from an adjacent roll than the distance between the other rolls of the series and said roll 21 is of less diameter than the other of said rolls. The rolls 16 to 21 both inclusive are provided respectively with shafts 22, 23, 24, 25, 26 and 27. Each shaft projects from each end of its respective roll. The projecting ends of said shafts are journaled in the sides 28 of the hopper 1 or suitable supporting means secured to the hopper 1 at the bottom thereof. The shafts 23, 24, 25 and 26 at one end project a greater distance from their rolls than the shafts 22 and 27. The shaft 27 at one end projects a greater distance from the hopper, at one side thereof than the other shafts of said rolls. Each of the rolls is formed throughout with a corrugated periphery, as indicated at 29 and the corrugations extend lengthwise of the rolls and from one end to the other end thereof. The shafts 23, 24, 25 and 26 at each end thereof carries a sprocket wheel 30. The shafts 24 and 27 at one end thereof carry a sprocket wheel 31. The sprocket wheels 30 carried by the shafts 23, 24, 25, and 26 at that side of the hopper opposite the side from which the shafts 22 and 27 extend and are provided with the sprocket wheel 31, are connected together by an endless chain or link belt 32. The belt 32 is independent of the shafts 22 and 27. The sprocket wheels 30 on the other ends of the shafts 23, 24, 25 and 26, as well as the sprocket wheels 31 on the ends of the shafts 22 and 27 are connected together by an endless belt or chain 33 which is driven from the shaft 27. The shaft 27 carries the pulley 10 which is driven from the transmission belt 6.

The conveying rolls 16 to 21 both inclusive, are preferably constructed of wood and with the diameter of the rolls 16, 17, 18, 19 and 20 preferably of six inches and the diameter of the roll 21 preferably five inches. It will be stated however that the diameter of the rolls can be of any size to provide for an efficient conveying action of the cotton towards the elevating apron. The belt 32 is driven from the shaft 26.

The cotton is taken up by the conveying rolls from within the hopper and conveyed to the lower end of the apron 2 where the same is elevated to the Dauber drum and from there it is conducted by the slide or conductor 8 to the feeder mechanism 15. The conveying rolls effect the forward movement of the cotton to the elevator apron and owing to the manner in which they are set up the cost of maintenance is materially less than when using a conveyor apron as the latter requires considerable attention relative to the repair thereof and also time lost in replacing the same. The fluted rolls act to take up the cotton and move it forwardly towards the elevator apron and such movement is continuous during the revolving action of the conveying rolls.

The feeder mechanism 15 which associates with the beater or knocker drum 4 consists of a set of lengthwise corrugated or fluted conveying rolls arranged within the upper end of the collector 5 and interposed between the conductor 8 and the drum 4. The conveying rolls of said set are indicated at 34, 35 and 36 and are synchronously operated. The rolls 34 and 35 are substantially of the same diameter and the roll 36 is of materially less diameter than the diameter of either of the rolls 34, 35. The roll 34 revolves rearwardly and the rolls 35 and 36 revolve forwardly, note the arrows indicating the direction of movement of said rolls. The roll 35 is positioned directly below the conductor 8 and receives the cotton therefrom. The roll 36 is arranged between the roll 35 and the beater or knocker drum. The roll 34 is arranged over the rolls 35 and 36. The shaft of the roll 34 is indicated at 37, that of the roll 35 at 38 and the shaft of roll 36 at 39. The shafts 38 and 39 are provided with cog wheels or pinions 40 connected together by a belt 41 and the shaft 38 is provided with a cog wheel 42 which is driven from the shaft 43 which carries the pulleys 9 and 44. The shaft 43 is driven from the belt 7. A sprindle 45 is arranged below the roll 36 and which is driven from the shaft 39, see Figure 1 and shaft or spindle 45 carries a cog pinion 46, which meshes with a cog pinion 47, carried by shaft 48 and said pinion 47 meshes with a pinion 49 carried by a spring controlled adjustable shaft 50. The shafts 48 and 50 are provided with feed rollers 51, see Figure 4 and these elements are of known construction and arrangement. A cleaner rack, which opposes the drum 4, is indicated at 52. A supporting means is indicated at 53 and is provided for the feeder mechanism 15. The arrangement of fluted or corrugated conveying rolls 34, 35 and 36 which associate with the drum 4, are substituted for the ordinary wooden slatted canvas apron now employed for feeding the cotton to the beater of knocker drum 4. The advantages possessed by the feeder mechanism 15 is the same as that referred to in connection with the feeder mechanism 14.

It is thought the many advantages of the feeder mechanism, in accordance with this invention, which form elements of machines for opening and preparing cotton for breaker devices, can be fully understood, and although the preferred embodiment of the invention is as illustrated and described yet it is to be understood that changes in the details of construction can be had which will fall within the scope of the invention as claimed.

What I claim is:

1. A conveying device for conducting in a forward direction cotton to the elevator of a cotton preparing machine comprising a set of lengthwise opposed, spaced, closely arranged, lengthwise corrugated, synchronously operable, forwardly revoluble conveyor rolls, said set consisting of a rear end roll, a forward end roll and a plurality of intermediate rolls, and means for driving said rolls synchronously.

2. A conveying device constructed in accordance with claim 1, the providing of the forward end roll of less diameter than the other of the rolls of the set, and the other of said rolls of the set being substantially of the same diameter.

3. A conveying device for the purpose set forth constructed in accordance with claim 1, the arranging of the forward end roll of the set a greater distance from an adjacent intermediate roll of the set than the distance between the other rolls of the set, the said other rolls of the set being of like diameter and the forward end roll of a set being of less diameter than the said other rolls of the set.

4. A conveying device for conducting cotton in a forward direction to the elevator of a cotton preparing machine comprising a set of lengthwise opposed, spaced, closely arranged, lengthwise corrugated, synchronously operable, forwardly revoluble conveying rolls, said set consisting of a rear end roll, a forward end roll and a plurality of intermediate rolls, a shaft for and projecting from each end of each of said rolls, a driving sprocket carried by each of said shafts at one end thereof, a driving sprocket carried by each of the shafts for the intermediate rolls at the other end of such shaft, a traveling endless chain engaging with the sprockets at one end of the rolls, a traveling endless chain engaging with the sprockets at the other end of the intermediate rolls, and means connected with the shaft of the forward end roll to provide for the operation of said rolls synchronously.

5. A conveying device for conducting cotton in a forward direction of the beater drum to a cotton preparing machine, comprising a set of lengthwise opposed, spaced, lengthwise corrugated, synchronously operable conveyor rolls, said set consisting of a rearwardly revolving upper forward roll, a forwardly revolving rear roll and a forwardly revolving lower forward roll, said upper roll positioned over said rear roll and lower forward roll.

6. A conveying device for the purpose set forth constructed in accordance with claim 5, said upper forward roll and rear roll being of the same diameter and said forward lower roll of materially less diameter than the diameter of the upper forward and rear rolls.

In testimony whereof, I affix my signature hereto.

JAMES W. GOODROE.